Figure 1:
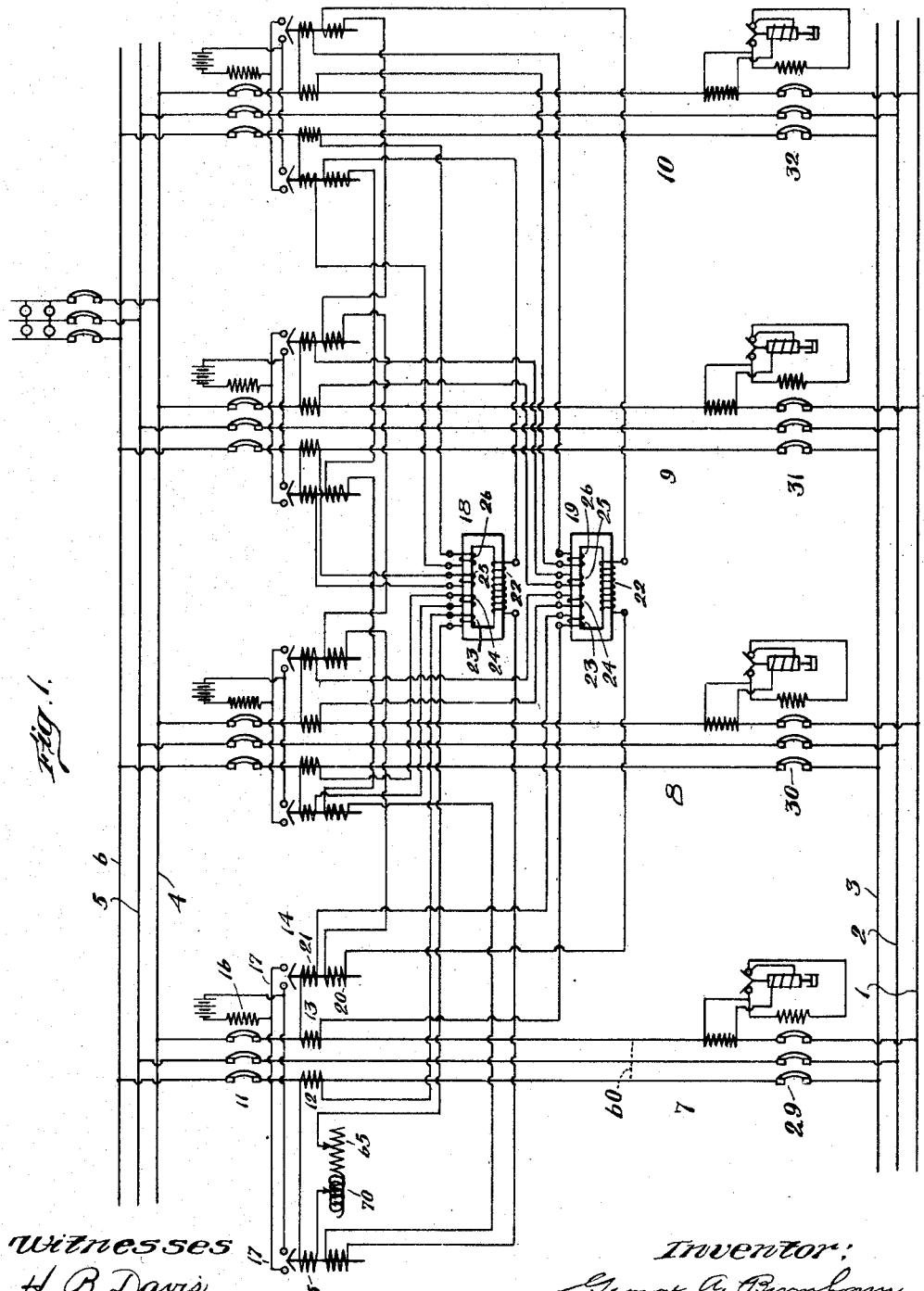

G. A. BURNHAM.
PROTECTING MEANS FOR ELECTRIC DISTRIBUTION SYSTEMS.
APPLICATION FILED FEB. 5, 1913.

1,208,473.

Patented Dec. 12, 1916.
2 SHEETS—SHEET 1.

Witnesses
H. B. Davis.
C. Doyle.

Inventor:
George A. Burnham
By Hayes & Harriman
Attys.

G. A. BURNHAM.
PROTECTING MEANS FOR ELECTRIC DISTRIBUTION SYSTEMS.
APPLICATION FILED FEB. 5, 1913.

1,208,473.

Patented Dec. 12, 1916.
2 SHEETS—SHEET 2.

Witnesses:
H. B. Davis
C. Doyle.

Inventor:
George A. Burnham
by Hays & Harriman
attys.

UNITED STATES PATENT OFFICE.

GEORGE A. BURNHAM, OF SAUGUS, MASSACHUSETTS, ASSIGNOR, BY MESNE ASSIGNMENTS, TO GENERAL ELECTRIC COMPANY, A CORPORATION OF NEW YORK.

PROTECTING MEANS FOR ELECTRIC DISTRIBUTION SYSTEMS.

1,208,473.     Specification of Letters Patent.     Patented Dec. 12, 1916.

Application filed February 5, 1913. Serial No. 746,281.

*To all whom it may concern:*

Be it known that I, GEORGE A. BURNHAM, a citizen of the United States, residing at Saugus, in the county of Essex and State of Massachusetts, have invented an Improvement in Protecting Means for Electric Distribution Systems, of which the following is a specification.

On account of the rapid increase of load on electric distribution systems, it becomes necessary to add additional feeders between various substations and also between generating stations and substations, and the protection of these parallel feeders from overloads and short-circuits and the proper isolation of feeders which are in trouble, without serious disturbance of other parts of the system, becomes a very important matter.

Heretofore, reverse-current relays used in conjuction with time-limit relays have been employed for such purpose, but the operation of a reverse-current relay of ordinary construction depends upon the potential of the system which is being protected, and the occurrence of a short circuit at or near the reverse-current relay, or even on the feeder with which the reverse-current relay is associated, results in a decrease of potential. This decrease of potential renders the reverse-current relay unreliable, and, in many instances, inoperative. In another form of protecting-means pilot-wires are run from one substation to another in order that an overload or short circuit on any particular feeder may simultaneously trip the switches at either end of the feeder by means of current passing through the pilot-wires. This form, although usually effective in its operation, has a great disadvantage in that it is necessary to run three or more pilot-wires the entire length of the distribution system, which results in a high cost of installation.

The object of this invention is to provide an improved form of protecting-means for electric distribution systems involving reverse-current relays, and means for maintaining current of unchanging polarity in one of the windings of every relay, whereby the usual potential-coil of the reverse-current relays are omitted, so that the objections above noted to the use of reverse current relays is removed.

Figure 2:
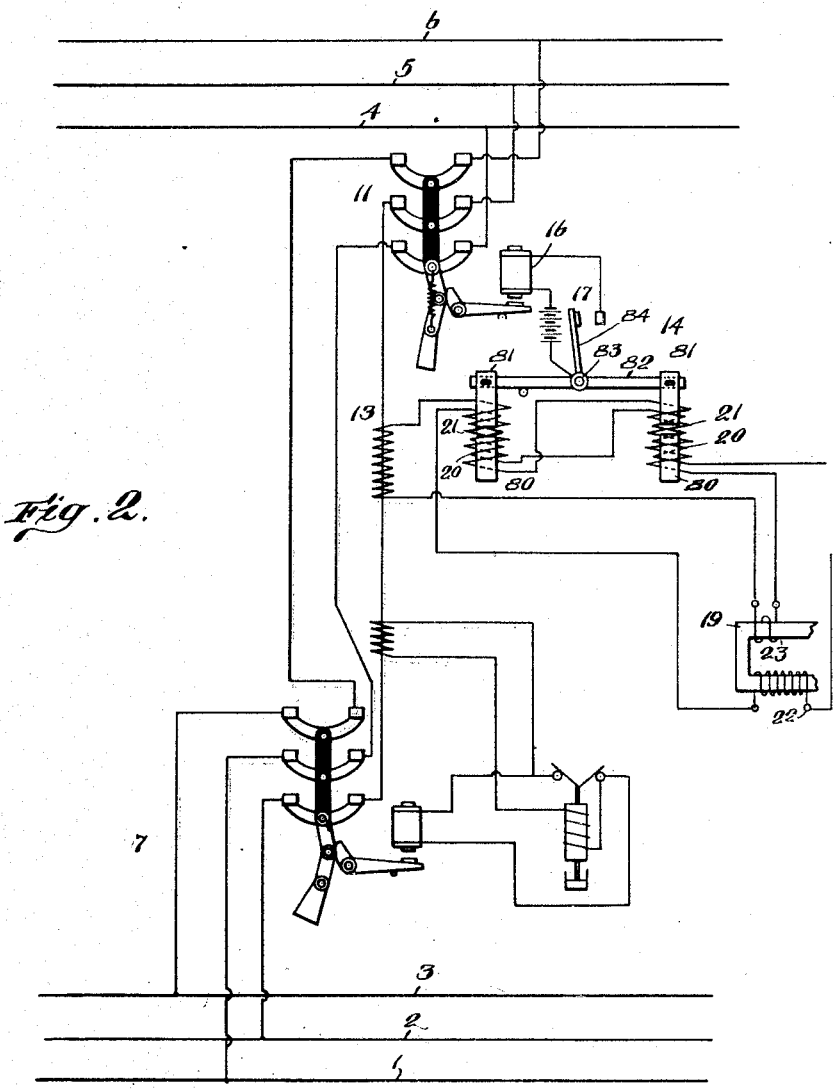

Figure 1 is a diagram of an improved protecting-means for electric distribution systems embodying this invention. Fig. 2 is an enlarged diagrammatical view of one feeder-section of the system.

1, 2, 3, represent the generator busbars; 4, 5, 6 the substation busbars. A plurality of feeders, designated as 7, 8, 9, 10, connect the substation busbars with the generator busbars. Each of said feeders is provided with a switching and relay equipment at each end. As here shown, the equipment at the substation ends of the feeders consists of a circuit-opening device or switch 11; current-transformers 12, 13; and reverse-current relays 14, 15; a trip-coil 16, for switch 11, which is energized from a current whose circuit is adapted to be closed by circuit-closers 17, controlled by said relays 14, 15.

The reverse-current relays preferably employed comprise essentially two differential coils, see Fig. 2, each having current windings 20, 21, arranged in the same magnetic circuit and on stationary cores 80, and each differential coil has an armature made as a movable core-piece 81, and said core-pieces 81 are attached to the extremities of a walking-beam 82, pivoted at 83, and bearing a movable contact-member 84, of a circuit-controller for the circuit of the tripping-coil 16; and said circuit controller is normally biased to open position.

Two transformers 18 and 19, herein termed "polarizing" transformers are employed, their function being to maintain a definite, uninterrupted current of unchanging polarity in one of the windings, as 20, of each reverse-current relay with which it is associated, irrespective of what the polarity of the associated winding, as 21, of said relay may be. The "polarizing" transformers here shown each consist of an iron core-piece and a plurality of primary-windings, as 23, 24, 25, 26, arranged on the core-piece, as many as there are feeders to be protected, and a common secondary winding 22, also arranged on the core-piece. The primary windings are arranged in the secondaries of the transformers 12, and 13, respectively, and in series relation with the windings 21 of the relays, and the secondary windings 22 are connected in circuits, which are common to and include all of the windings 20 of said relays. When the polarizing transformers are thus arranged in circuit it will be seen that a definite, uninterrupted current of unchanging polarity flows through the windings 20 of all of the relays, although said relays are at all times under the influence of changes in polarity of the circuits with which they are associated through their windings 21. Furthermore, it will be observed that when said polarizing transformers are thus constructed and arranged in circuit, the primary windings are associated individually with all of the sections to be protected, and the secondary winding is associated with all of the relays, thus admitting of the relays being operated upon reversal of the current in the sections with which they are associated.

I do not wish to limit myself to any particular form or construction of transformer, or polarizing transformer, or relay, so long as they are constructed and arranged to embody, in general the spirit and scope of my invention; the current of the secondary of the polarizing-transformer however being dependent upon the load on the feeder-system and the direction of current being independent of short-circuit conditions on any one of the several feeders.

While I have shown my invention as applied to a three phase, ungrounded-neutral system, it is evident that by a simple duplication of parts it may be used on either single-phase or any of the polyphase distribution systems.

The operation is as follows: The normal flow of current is from the generator to the substation busbars, and in normal operation the current flows in the same direction through all the feeders. The transformers of each of the feeder-circuits are so related to said circuits that the main current in said circuit will cause current to flow through one of the windings of all of the relays in the same direction, and the current of each individual transformer also passes through its corresponding primary winding of the polarizing-transformer in a direction such that their effect will be cumulative and induce in the common secondary of said polarizing-transformer a current which will flow through the other windings of the relays in a direction opposite to that of the aforesaid windings of said relays. Each phase or wire of each feeder may have a transformer, and each set of transformers will be associated with one polarizing-transformer corresponding to the particular phase of the circuit. Thus it will be seen that under normal operation the reverse-current relays will be inoperative, and by their construction it will be seen that they are not responsive to a rise in potential or overload condition, being only responsive to and operative upon a reversal of current. Suppose a short circuit occurs at say, 60, in the feeder-circuit 7. The current will then flow from the generator busbars over the feeder-circuit 7, to the fault, 60, in the proper direction, also through the feeders 8, 9, 10, and their corresponding current-transformers and relays, and the busbars 4, 5, 6, in the proper direction, but will pass through the switch 11, to the current-transformers 12, 13, in a reverse direction. This will result in the current in the secondaries of transformers 12, 13, being reversed and will cause a reversal of current in the windings 21 of the relays, as for instance in the relay 14, and will also result in reversal of current in its primary winding 23, of the polarizing-transformer 19. The exciting influence of the primary winding of the polarizing transformer 19, is now, say, windings 24, 25 and 26, although the winding 23 has partially neutralized, but the direction of current remains the same and they are still substantially effective. During the time of short circuit and overload, the time-limit relays controlling and protecting the switches 29, 30, 31, 32, will be operating, but they will not have tripped their switches on account of the time element which is provided, the operation, however, of relay 14 causing switch 11, to open instantaneously on reversal of current which will cause the current in the feeders 8, 9, 10, to drop instantly to a value necessary to supply the translating devices in other parts of the distribution system. The time-limit relay controlling the switch 29, however, will continue to operate and open its switch, which will thus completely isolate feeder-circuit 7, with its trouble, from the rest of the system, without the interruption of any apparatus which might be connected to it.

It will be well-known that with commercial forms of current transformers, variation in the loads affects the ratio to some extent, and in a device which is dependent upon a balance of currents, it is necessary, on account of the different lengths of transformer-circuits, to employ some means to balance the secondary currents of the various transformers. For this reason I may employ an adjustable impedance, here shown as a resistance 65, and a reactance 70, arranged so that a varying amount of resistance and reactance may be introduced into the circuits of the transformers. To illustrate its application herein, I have shown a variable impedance as connected in the circuit of transformer 12.

The term unchanging polarity herein used is understood to relate to the polarity of the windings with respect to the polarity of the associated windings, and is to be distinguished from the regular changes of polarity due to the characteristics of an alternating current.

I claim:

1. The combination in a system of distribution of a plurality of parallel transmission lines, a single series transformer for each line, a transformer energized by current from the series transformers of all of the lines, and a reverse current relay for each line having one winding connected to the secondary of the series transformer in that line and a second winding connected to a secondary of the common transformer.

2. The combination in a system of distribution of a plurality of parallel transmission lines, a single series transformer for each line, a transformer having a plurality of primary coils one of which is connected in the secondary circuit of each of the first mentioned transformers, and a reverse current relay for each line having one winding connected to the secondary of the series transformer in that line, and a second winding connected to a secondary winding of the common transformer.

3. The combination in a system of distribution of a plurality of parallel transmission lines, a single series transformer for each line, a transformer having a plurality of primary coils, one of which is connected in the secondary circuit of each of the first mentioned transformers, and a single secondary coil, and a reverse current relay for each line having one winding connected to the secondary of the series transformer in that line, and a second winding connected to the secondary winding of the common transformer.

4. The combination in a system of distribution of a plurality of parallel transmission lines, a single series transformer for each line, a transformer energized by current from the series transformers of all of the lines, and a reverse current relay for each line having differential windings, one winding connected to the secondary of the series transformer in that line and the second winding connected to a secondary of the common transformer.

5. The combination in a system of distribution of a plurality of parallel transmission lines, a single series transformer for each line, a transformer having a plurality of primary coils, one of which is connected in the secondary circuit of each of the first mentioned transformers, and a reverse current relay for each line having differential windings, one winding connected to the secondary of the series transformer in that line and the second winding connected to a secondary winding of the common transformer.

6. The combination in a system of distribution of a plurality of parallel transmission lines, a single series transformer for each line, a transformer having a plurality of primary coils, one of which is connected in the secondary circuit of each of the first mentioned transformers, and a single secondary winding and a reverse current relay for each line having differential windings, one winding connected to the secondary of the series transformer in that line and the second winding connected to the secondary winding of the common transformer.

7. The combination in a system of distribution of a plurality of parallel transmission lines, a series transformer for each line, a transformer having a plurality of primary windings one of which is connected in the secondary circuit of each of the first mentioned transformers and a single secondary winding, and a reverse current relay for each line having differential windings, one winding connected to the secondary of the series transformer in that line, and a second winding connected in series with the secondary winding of the common transformer and in series with the second windings of the other relays.

8. The combination in a system of distribution of a plurality of parallel transmission lines, a series transformer for each line, a transformer having a plurality of primary windings, one of which is connected in the secondary circuit of each of the first mentioned transformers and a single secondary winding, a reverse current relay for each line having differential windings one winding connected to the secondary of the series transformer in that line, and a second winding connected in series with the secondary winding of the common transformer and in series with the second windings of the other relays, and an adjustable impedance in the circuit of each of the series transformers.

In testimony whereof, I have signed my name to this specification, in the presence of two subscribing witnesses.

GEORGE A. BURNHAM.

Witnesses:
B. J. NOYES,
H. B. DAVIS.

Copies of this patent may be obtained for five cents each, by addressing the "Commissioner of Patents, Washington, D. C."